(12) United States Patent
Jeong et al.

(10) Patent No.: US 12,359,084 B2
(45) Date of Patent: Jul. 15, 2025

(54) INK COMPOSITION, LAYER USING SAME, AND DISPLAY DEVICE

(71) Applicant: SAMSUNG SDI CO., LTD., Yongin-si (KR)

(72) Inventors: Jiyoung Jeong, Suwon-si (KR); Misun Kim, Suwon-si (KR); Young Min Kim, Suwon-si (KR); Janghyuk Kim, Suwon-si (KR); Dong Wan Ryu, Suwon-si (KR); Young Woo Park, Suwon-si (KR); Chuljin Park, Suwon-si (KR); Eun Sun Yu, Suwon-si (KR); Jinsuop Youn, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/257,220

(22) PCT Filed: Feb. 14, 2022

(86) PCT No.: PCT/KR2022/002124
§ 371 (c)(1),
(2) Date: Jun. 13, 2023

(87) PCT Pub. No.: WO2022/177238
PCT Pub. Date: Aug. 25, 2022

(65) Prior Publication Data
US 2024/0352270 A1    Oct. 24, 2024

(30) Foreign Application Priority Data

Feb. 22, 2021 (KR) .......... 10-2021-0023411

(51) Int. Cl.
*C09D 11/52* (2014.01)
*C09D 11/033* (2014.01)
(Continued)

(52) U.S. Cl.
CPC ............ *C09D 11/52* (2013.01); *C09D 11/033* (2013.01); *C09D 11/037* (2013.01); *G02F 1/167* (2013.01); *G02F 2001/1678* (2013.01)

(58) Field of Classification Search
CPC ..... C09D 11/52; C09D 11/033; C09D 11/037; C09D 5/44; C09D 7/20; C09D 7/62;
(Continued)

(56) References Cited

U.S. PATENT DOCUMENTS

2005/0074589 A1 * 4/2005 Pan ........................ C09D 11/30
428/206
2006/0110896 A1 5/2006 Kobayashi et al.
(Continued)

FOREIGN PATENT DOCUMENTS

CN    1919942 A    2/2007
CN    103756412 A    4/2014
(Continued)

OTHER PUBLICATIONS

Chinese Office Action dated Sep. 10, 2024, issued in corresponding Chinese Patent Application No. 202280007406.5, 5 pages.
(Continued)

*Primary Examiner* — Mark Kopec
*Assistant Examiner* — Jaison P Thomas
(74) *Attorney, Agent, or Firm* — Womble Bond Dickinson (US) LLP

(57) ABSTRACT

Provided are an ink composition, a layer prepared using the ink composition, and a display device comprising the layer, the ink composition comprising a solvent comprising (A) semiconductor nanorods, and (B) at least one diol-based compound, wherein the ink composition has a viscosity of at least 50 cps at 20° C. to 25° C. and at most 20 cps at 35° C. to 65° C.

17 Claims, 1 Drawing Sheet

(51) Int. Cl.
  *C09D 11/037* (2014.01)
  *G02F 1/167* (2019.01)
  *G02F 1/1675* (2019.01)

(58) Field of Classification Search
  CPC ....... C09D 11/03; C09D 11/322; C09D 11/38; C09D 5/448; G02F 1/167; G02F 2001/1678; C08G 63/685; C08G 63/6856; C08K 3/10; C08K 3/22; C08K 3/36; C08K 9/02
  See application file for complete search history.

(56) References Cited

U.S. PATENT DOCUMENTS

| | | |
|---|---|---|
| 2006/0213391 A1 | 9/2006 | Sugal et al. |
| 2009/0314991 A1 | 12/2009 | Cho et al. |
| 2010/0227958 A1 | 9/2010 | Idemura et al. |
| 2011/0088511 A1 | 4/2011 | Jalaledin et al. |
| 2014/0051242 A1* | 2/2014 | Lockett .................. C09D 11/52 252/514 |
| 2014/0186721 A1 | 7/2014 | Zhang et al. |
| 2016/0013215 A1 | 1/2016 | Ueda et al. |
| 2017/0175293 A1 | 6/2017 | Banin et al. |
| 2020/0103709 A1* | 4/2020 | Madigan ................ C09K 11/70 |
| 2021/0017413 A1 | 1/2021 | Tsuruta et al. |
| 2021/0398956 A1 | 12/2021 | Jung et al. |
| 2022/0056292 A1* | 2/2022 | Otsuki .................. C09D 11/52 |
| 2023/0227994 A1* | 7/2023 | Youn ..................... C25D 13/08 205/109 |

FOREIGN PATENT DOCUMENTS

| | | | | |
|---|---|---|---|---|
| CN | 109354924 A | * | 2/2019 | ............ C09D 11/30 |
| JP | 2003-330179 A | | 11/2003 | |
| JP | 2005-523231 A | | 8/2005 | |
| JP | 2007-254735 A | | 10/2007 | |
| JP | 2012-060084 A | | 3/2012 | |
| JP | 2012-172135 A | | 9/2012 | |
| JP | 2014-127501 A | | 7/2014 | |
| JP | 2015-201510 A | | 11/2015 | |
| JP | 2017-037761 A | | 2/2017 | |
| JP | 2019-86745 A | | 6/2019 | |
| JP | 2019-112575 A | | 7/2019 | |
| KR | 10-0777662 B1 | | 11/2007 | |
| KR | 10-2009-0078099 A | | 7/2009 | |
| KR | 10-2014-0000735 A | | 1/2014 | |
| KR | 10-2015-0080369 A | | 7/2015 | |
| KR | 10-2017-0032315 A | | 3/2017 | |
| KR | 10-2018-0089885 A | | 8/2018 | |
| KR | 10-2020-0050000 A | | 5/2020 | |
| TW | 200417805 A | | 9/2004 | |
| WO | WO 2010/055845 A1 | | 5/2010 | |
| WO | WO 2019/069737 A1 | | 4/2019 | |

OTHER PUBLICATIONS

Japanese Office Action dated Jul. 30, 2024, issued in corresponding Japanese Patent Application No. 2023-536948, 5 pages.
Korean Office Action dated Aug. 25, 2024, issued in corresponding Korean Patent Application No. 10-2021-0023411, 6 pages.
Chinese Office Action for CN Application No. 202280007406.5. dated Dec. 26, 2023, 8 pages.
International Search Report of PCT/KR2022/002124, May 24, 2022, 6 pp.

* cited by examiner

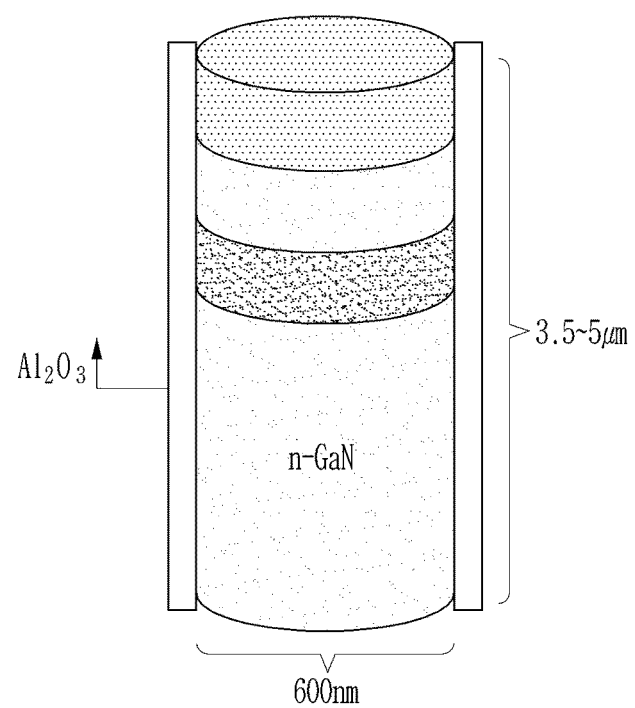

INK COMPOSITION, LAYER USING SAME, AND DISPLAY DEVICE

CROSS-REFERENCE TO RELATED APPLICATIONS

This application is a U.S. National Phase Patent Application of International Application Number PCT/KR2022/002124, filed on Feb. 14, 2022, which claims priority to Korean Patent Application Number 10-2021-0023411, filed on Feb. 22, 2021, the entire content of each of which is incorporated herein by reference.

TECHNICAL FIELD

This disclosure relates to an ink composition and a layer and a display device using the same.

BACKGROUND ART

LEDs have been actively developed since 1992 when Nakamura and others from Japanese Nichia Corp. succeeded in fusing a high-quality single crystal GaN nitride semiconductor by applying a low temperature GaN compound buffer layer. LED is a semiconductor device converting electric signals into light having wavelengths in a desired region by using characteristics of a compound semiconductor, which has a structure that an n-type semiconductor crystal in which a plurality of carriers is electrons and a p-type semiconductor crystal in which a plurality of carriers is holes are combined to each other.

This LED semiconductor has high light conversion efficiency and thus consumes very little energy and has a semi-permanent life-span and also, is environmentally-friendly and thus called to be a revolution of light as a green material. Recently, high luminance red, orange, green, blue, and white LEDs have been developed with the development of compound semiconductor technology and are being applied in many fields such as traffic lights, mobile phones, car headlights, outdoor billboards, LCD BLU (back light unit), and indoor/outdoor lighting, which keeps being actively researched at home and abroad. Particularly, a GaN-based compound semiconductor having a wide bandgap is a material used to manufacture a LED semiconductor emitting light in green, blue, and ultraviolet (UV) regions, and since a blue LED device is used to manufacture a white LED device, lots of research is being made on this.

Among these series of studies, studies using ultra-small LED devices having a nano or micro unit size are being actively conducted, and in addition studies for utilizing these ultra-small LED devices in lighting and displays are being continuously made. In these studies, electrodes capable of applying power to the ultra-small LED devices, disposition of the electrodes for reducing a space occupied by the electrodes, a method of mounting the ultra-small LED devices on the disposed electrodes, and the like are continuously attracting attentions.

Among these, the method of mounting the ultra-small LED devices on the disposed electrodes still have difficulties of disposing and mounting the ultra-small LED devices on the electrodes as intended due to size limitations of the ultra-small LED devices. The reason is that the ultra-small LED devices are nano-scale or micro-scale and thus may not be one by one disposed and mounted by hand on a target electrode region.

Recently, as the demand for the nano-scale ultra-small LED devices is increasing, an attempt to manufacture a nano-scale GaN-based or InGaN-based compound semiconductor into a rod has been made, but there is a problem that dispersion stability of a nanorod itself in a solution (or a polymerizable compound) is greatly deteriorated. However, dispersion stability in solution may be greatly reduced due to large particle sizes of the nanorods themselves. And, until now, there has been no introduction of a technology capable of improving dispersion stability of semiconductor nanorods in a solution.

DISCLOSURE

Technical Problem

An embodiment provides an ink composition having high viscosity at room temperature to impart sedimentation stability to semiconductor nanorods, and at the same time having low viscosity at high temperature to provide excellent ink-jetting properties.

Another embodiment provides a layer manufactured using the ink composition.

Another embodiment provides a display device including the layer.

Technical Solution

An embodiment provides an ink composition including (A) semiconductor nanorods; and (B) a solvent including at least at least one diol-based compound, wherein the ink composition has a viscosity of greater than or equal to 50 cps at 20° C. to 25° C. and less than or equal to 20 cps at 35° C. to 65° C.

The diol-based compound may be represented by Chemical Formula 1.

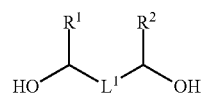

[Chemical Formula 1]

In Chemical Formula 1, $R^1$ and $R^2$ are each independently hydrogen, a substituted or unsubstituted C1 to C20 alkyl group, a substituted or unsubstituted C3 to C20 cycloalkyl group, or a substituted or unsubstituted C6 to C20 aryl group, and $L^1$ is a substituted or unsubstituted C1 to C20 alkylene group.

The diol-based compound may include at least one of compounds represented by Chemical Formula 1-1 to Chemical Formula 1-5.

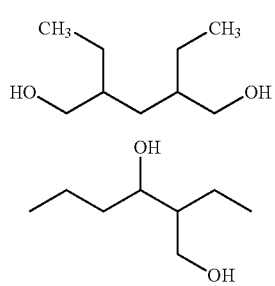

[Chemical Formula 1-1]

[Chemical Formula 1-2]

[Chemical Formula 1-3]

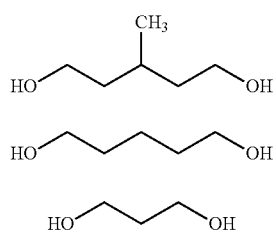

[Chemical Formula 1-4]

[Chemical Formula 1-5]

The solvent may further include a compound represented by Chemical Formula 2 or Chemical Formula 3.

[Chemical Formula 2]

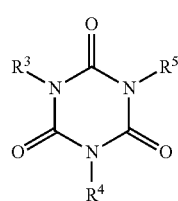

[Chemical Formula 3]

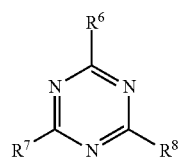

In Chemical Formula 2 and Chemical Formula 3,
$R^3$ to $R^5$ are each independently a substituted or unsubstituted C1 to C20 alkyl group, and
$R^6$ to $R^8$ are each independently a substituted or unsubstituted C1 to C20 alkoxy group.

In Chemical Formula 2, $R^3$ to $R^5$ may each independently be a C1 to C20 alkyl group substituted or unsubstituted with a C2 to C10 alkenyl group.

In Chemical Formula 3, $R^6$ to $R^8$ may each independently be a C1 to C20 alkoxy group substituted or unsubstituted with a C2 to C10 alkenyl group.

The compound represented by Chemical Formula 2 may include at least one selected from Chemical Formula 2-1 and Chemical Formula 2-2.

[Chemical Formula 2-1]

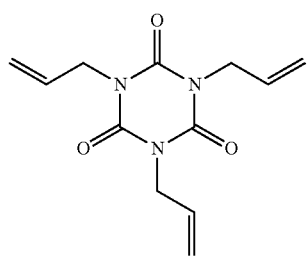

[Chemical Formula 2-2]

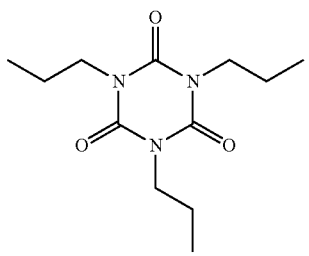

The compound represented by Chemical Formula 3 may include at least one selected from compounds represented by Chemical Formula 3-1 and Chemical Formula 3-2.

[Chemical Formula 3-1]

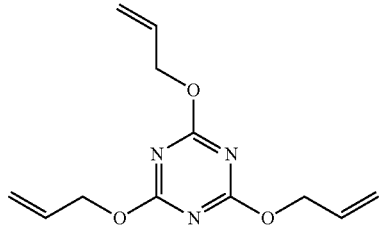

[Chemical Formula 3-2]

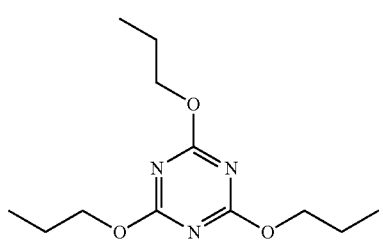

The compound represented by Chemical Formula 2 or Chemical Formula 3 may be included in a smaller amount than the compound having the diol structure.

The solvent may further include a compound represented by Chemical Formula 4.

[Chemical Formula 4]

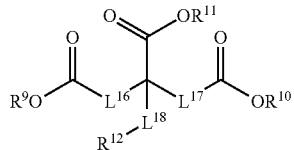

In Chemical Formula 4,
$R^9$ to $R^{11}$ are each independently a hydrogen atom or a C1 to C10 alkyl group,
$R^{12}$ is a hydrogen atom or *—C(=O)$R^{13}$ ($R^{13}$ is a C1 to C10 alkyl group),
$L^{18}$ and $L^{17}$ are each independently a substituted or unsubstituted C1 to C20 alkylene group or a substituted or unsubstituted C6 to C20 arylene group, and
$L^{18}$ is *—O—*, *—S—*, or *—NH—*.

The diol-based compound and the compound represented by Chemical Formula 4 may be included in a weight ratio of 3:7 to 8:2.

The semiconductor nanorods may have a diameter of 300 nm to 900 nm.

The semiconductor nanorods may have a length of 3.5 μm to 5 μm.

The semiconductor nanorods may include a GaN-based compound, an InGaN-based compound, or a combination thereof.

The semiconductor nanorods may have a surface coated with a metal oxide.

The metal oxide may include alumina, silica, or a combination thereof.

The semiconductor nanorods may be included in an amount of 0.01 wt % to 10 wt % based on the total amount of the ink composition.

The ink composition may further include a polymerization inhibitor; malonic acid; 3-amino-1,2-propanediol; a silane-based coupling agent; a leveling agent; a fluorine-based surfactant; or a combination thereof.

The ink composition may be an ink composition for an electrophoresis device.

Another embodiment provides a layer manufactured using the ink composition.

Another embodiment provides a display device including the layer.

Other embodiments of the present invention are included in the following detailed description.

Advantageous Effects

According to an embodiment, the ink composition may have excellent dielectrophoretic properties and dispersion stability of semiconductor nanorods at the same time.

DESCRIPTION OF DRAWINGS

FIG. 1 is an example of a cross-sectional view of a semiconductor nanorod used in an ink composition according to an embodiment.

BEST MODE

Hereinafter, embodiments of the present invention are described in detail. However, these embodiments are exemplary, the present invention is not limited thereto and the present invention is defined by the scope of claims.

As used herein, when specific definition is not otherwise provided, "alkyl group" refers to a C1 to C20 alkyl group, "alkenyl group" refers to a C2 to C20 alkenyl group, "cycloalkenyl group" refers to a C3 to C20 cycloalkenyl group, "heterocycloalkenyl group" refers to a C3 to C20 heterocycloalkenyl group, "aryl group" refers to a C6 to C20 aryl group, "arylalkyl group" refers to a C6 to C20 arylalkyl group, "alkylene group" refers to a C1 to C20 alkylene group, "arylene group" refers to a C6 to C20 arylene group, "alkylarylene group" refers to a C6 to C20 alkylarylene group, "heteroarylene group" refers to a C3 to C20 heteroarylene group, and "alkoxylene group" refers to a C1 to C20 alkoxylene group.

As used herein, when specific definition is not otherwise provided, "substituted" refers to replacement of at least one hydrogen by a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

As used herein, when specific definition is not otherwise provided, the term "hetero" refers to one including at least one heteroatom selected from N, O, S and P in a chemical formula.

As used herein, when specific definition is not otherwise provided, "(meth)acrylate" refers to both "acrylate" and "methacrylate", and "(meth)acrylic" refers to "acrylic" and "methacrylic."

As used herein, when specific definition is not otherwise provided, "combination" refers to mixing or copolymerization.

As used herein, unless a specific definition is otherwise provided, a hydrogen atom is boned at the position when a chemical bond is not drawn where supposed to be given.

As used herein, "semiconductor nanorod" refers to a rod-shaped semiconductor having a nano-sized diameter.

As used herein, when specific definition is not otherwise provided, "*" indicates a point where the same or different atom or chemical formula is linked.

An ink composition according to an embodiment includes (A) semiconductor nanorods; and (B) a solvent including at least at least one diol-based compound, wherein the ink composition has a viscosity of greater than or equal to 50 cps at 20° C. to 25° C. and less than or equal to 20 cps at 35° C. to 65° C.

Recently, studies on various concepts having effects of improving energy efficiency and preventing efficiency drop of conventional LEDs such as micro LED, mini LED, and the like have been actively conducted. Among them, an alignment (electrophoresis) of InGaN-based nanorod LEDs using an electric field draws attentions as a method of dramatically reducing complex and expensive process costs of the micro LED, the mini LED, and the like.

In order to coat the semiconductor nanorods on a substrate for electrophoresis, semiconductor nanorod dispersion should be ink-jetted or slit-coated. Particularly, the semiconductor nanorods should be uniformly coated for large-area coating and panel production, which may be achieved by securing dispersion stability of the semiconductor nanorod solution. In addition, in order to increase luminous efficiency of the LED, a high dielectrophoresis rate is an essential parameter. The present invention relates to a novel ink-jetting ink composition capable of simultaneously achieving dispersion stability of semiconductor nanorods and high dielectrophoresis rate.

Hereinafter, each component is described in detail.

(A) Semiconductor Nanorods

The semiconductor nanorods may include a GaN-based compound, an InGaN-based compound, or a combination thereof, and the surface thereof may be coated with a metal oxide. In order to secure dispersion stability of a semiconductor nanorod ink solution (semiconductor nanorods+solvent), it usually takes 3 hours, which is insufficient time to perform a large area inkjet process. Accordingly, the inventors of the present invention have developed an insulating film ($Al_2O_3$ or $SiO_x$) by coating a metal oxide such as alumina, silica, or a combination thereof on the surface of a semiconductor nanorod after numerous trial and error studies to maximize compatibility with a solvent described below.

For example, the insulating film coated with the metal oxide may have a thickness of 40 nm to 60 nm.

The semiconductor nanorods include an n-type confinement layer and a p-type confinement layer, and a multi quantum well (MQW) active region active region may be disposed between the n-type confinement layer and the p-type confinement layer. (refer to FIG. 1)

For example, the semiconductor nanorods may have a diameter of 300 nm to 900 nm, for example, 600 nm to 700 nm.

For example, the semiconductor nanorods may have a length of 3.5 μm to 5 μm.

For example, when the semiconductor nanorods may include an alumina insulating layer, it may have a density of 5 g/cm³ to 6 g/cm³.

For example, the semiconductor nanorods may have a mass of $1\times10^{-13}$ g to $1\times10^{-11}$ g.

When the semiconductor nanorods have the above diameter, length, density and type, the surface coating of the metal oxide may be easily performed, so that dispersion stability of the semiconductor nanorods may be maximized.

The semiconductor nanorods may be included in an amount of 0.01 wt % to 10 wt %, for example 0.02 wt % to 8 wt %, for example 0.03 wt % to 5 wt % based on the total amount of the ink composition. When the semiconductor nanorods are included within the above range, dispersibility in the ink is good, and the prepared pattern may have excellent luminance.

(B) Solvent

The ink composition according to an embodiment includes a solvent.

Organic solvents such as propylene glycol monomethyl ether acetate (PEGMEA), Y-butyrolactone (GBL), polyethylene glycol methyl ether (PGME), ethylacetate, isopropylalcohol (IPA), and the like, which have been used in conventional displays and electron materials have so low viscosity that inorganic material nanorod particles with high density are too fast sedimented, resulting in unsatisfactory dielectrophoretic properties. Accordingly, in order to develop NED (nanorod led)-ink, a solvent capable of imparting sedimentation stability should be used. However, a solvent with simply high viscosity has a problem of not being sprayed during the ink-jetting. In order to improve this problem, the present inventors have developed a solvent having high viscosity at room temperature but simultaneously, low viscosity at a higher temperature than the room temperature by increasing a temperature for the ink-jetting and finally, completed an ink composition including the solvent having these characteristics.

Specifically, an embodiment introduces a compound having a diol structure with a hydrogen bond into the solvent to secure the characteristics of increasing the viscosity of the ink composition and reducing the viscosity at a higher temperature than the room temperature. However, when a compound having other structures with the hydrogen bond than the diol structure, for example, a compound having a multi-ol (polyol) structure with three or more hydroxy groups is introduced into the solvent, since a dielectric constant is too high to deteriorate dielectrophoretic properties, the solvent may not be suitably used in the ink composition according to an embodiment.

When the viscosity of the solvent is high at room temperature, dispersion stability may be secured for 10 hours or more, and in order to secure the dispersion stability for a long time, the solvent may desirably have as high viscosity as possible at room temperature and specifically, viscosity of 50 cps or higher (e.g., 50 cps to 2,000 cps) at 20° C. to 25° C.

More specifically, in order to secure Ink-jetting characteristics, the viscosity of the solvent should be 20 cps or less (e.g., 1 cps to 20 cps) at a high temperature (35° C. to 65° C., for example 40° C. to 50° C.), and also, in order to secure a solvent having a large viscosity difference at the room temperature (e.g., 20° C. to 25° C.) and the high temperature, a diol-based compound represented by Chemical Formula 1 may be applied alone or as a mixture to control a dielectric constant and viscosity.

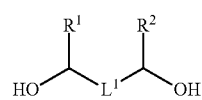

[Chemical Formula 1]

In Chemical Formula 1, $R^1$ and $R^2$ are each independently hydrogen, a substituted or unsubstituted C1 to C20 alkyl group, a substituted or unsubstituted C3 to C20 cycloalkyl group, or a substituted or unsubstituted C6 to C20 aryl group, and $L^1$ is a substituted or unsubstituted C1 to C20 alkylene group.

For example, the diol-based compound may include at least one of compounds represented by Chemical Formula 1-1 to Chemical Formula 1-5, but is not necessarily limited thereto.

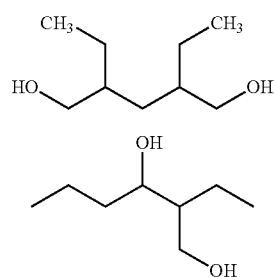

[Chemical Formula 1-1]

[Chemical Formula 1-2]

[Chemical Formula 1-3]

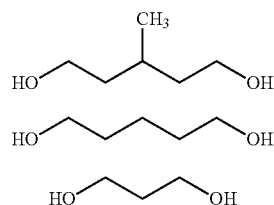

[Chemical Formula 1-4]

[Chemical Formula 1-5]

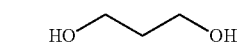

For example, the diol-based compound may be included in an amount of 20 wt % to 85 wt %, for example 30 wt % to 80 wt %, based on the total amount of the ink composition. When the content of the compound having the diol structure is within the above range, dispersion stability of the semiconductor nanorods may be improved while having an appropriate dielectric constant.

For example, the solvent may further include at least one or more of compounds represented by Chemical Formula 2, Chemical Formula 3 and Chemical Formula 4.

[Chemical Formula 2]

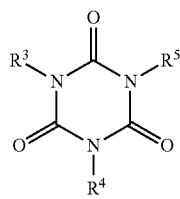

[Chemical Formula 3]

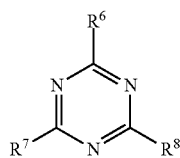

[Chemical Formula 4]

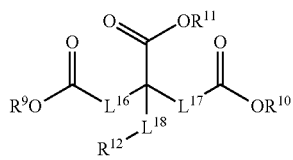

In Chemical Formula 2 to Chemical Formula 4, $R^3$ to $R^5$ are each independently a substituted or unsubstituted C1 to C20 alkyl group, and $R^6$ to $R_8$ are each independently a substituted or unsubstituted C1 to C20 alkoxy group.

$R^9$ to $R^{11}$ are each independently a hydrogen atom or a C1 to C10 alkyl group, $R^{12}$ is a hydrogen atom or *—C(=O)$R^{13}$ ($R^{13}$ is a C1 to C10 alkyl group), $L^{16}$ and $L^{17}$ are each independently a substituted or unsubstituted C1 to C20 alkylene group or a substituted or unsubstituted C6 to C20 arylene group, and $L^{18}$ is *—O—*, *—S—*, or *—NH—*.

For example, in Chemical Formula 2, $R^3$ to R$ may each independently be a C1 to C20 alkyl group substituted or unsubstituted with a C2 to C10 alkenyl group.

For example, in Chemical Formula 3, $R^6$ to $R^8$ may each independently be a C1 to C20 alkoxy group substituted or unsubstituted with a C2 to C10 alkenyl group.

For example, the compound represented by Chemical Formula 2 may include at least one selected from Chemical Formula 2-1 and Chemical Formula 2-2, but is not necessarily limited thereto.

[Chemical Formula 2-1]

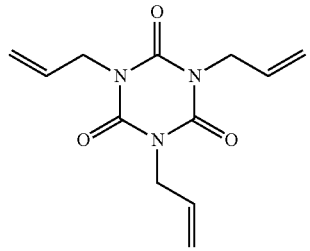

[Chemical Formula 2-2]

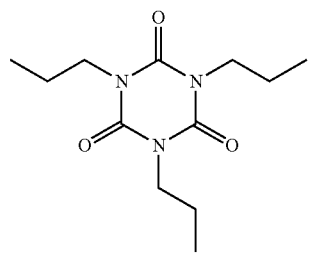

For example, the compound represented by Chemical Formula 3 may include at least one selected from compounds represented by Chemical Formula 3-1 and Chemical Formula 3-2.

[Chemical Formula 3-1]

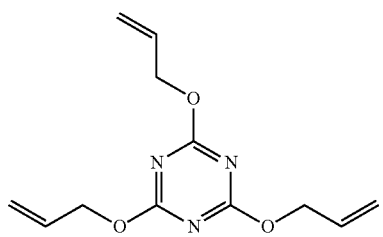

[Chemical Formula 3-2]

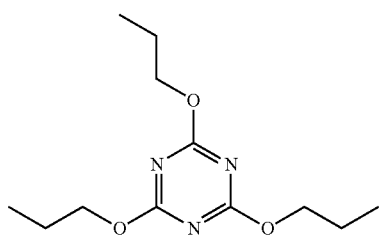

For example, the compound represented by Chemical Formula 4 may be citric acid. For example, the compound represented by Chemical Formula 4 may be represented by any one of Chemical Formula 4-1 to Chemical Formula 4-6, but is not necessarily limited thereto.

[Chemical Formula 4-1]

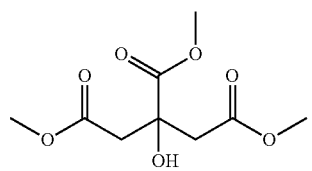

[Chemical Formula 4-2]

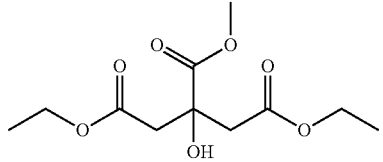

-continued

[Chemical Formula 4-3]

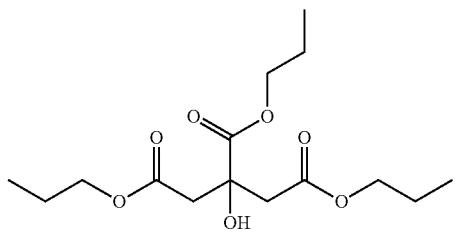

[Chemical Formula 4-4]

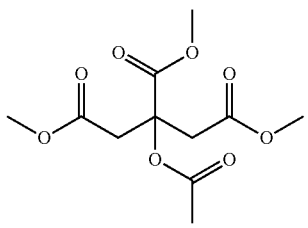

[Chemical Formula 4-5]

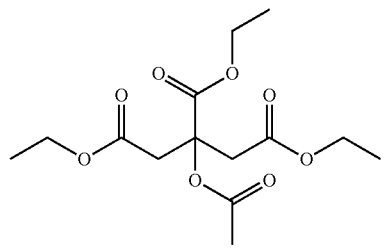

[Chemical Formula 4-6]

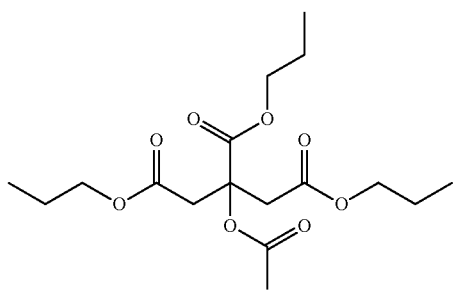

For example, the compound represented by Chemical Formula 2 or Chemical Formula 3 may be included in a smaller amount than the diol-based compound.

For example, the diol-based compound and the compound represented by Chemical Formula 4 may be included in a weight ratio of 3:7 to 8:2.

A conventional organic solvent such as propylene glycol monomethyl ether acetate (PEGMEA), Y-butyrolactone (GBL), polyethylene glycol methyl ether (PGME), ethylacetate, isopropylalcohol (IPA), and the like all have low viscosity and thus have a limit in improving sedimentation stability of the semiconductor nanorods with high density, but when at least one compound represented by Chemical Formulas 2 to 4 is additionally used with the diol-based compound, since viscosity of the ink composition may be easily controlled at room temperature and a higher temperature than the room temperature, the sedimentation stability of the semiconductor nanorods may be greatly improved, and in addition, an appropriate dielectric constant may be secured, greatly improving a dielectrophoresis rate.

The solvent may be included in an amount of 15 wt % to 99.9 wt %, for example 15 wt % to 99.8 wt %, for example 20 wt % to 99.7 wt % based on the total amount of the ink composition.

Polymerizable Monomer

The ink composition according to the embodiment may further include a polymerizable monomer having a carbon-carbon double bond at the terminal end thereof.

The polymerizable monomer may be used by mixing monomers or oligomers generally used in conventional curable compositions.

For example, the polymerizable monomer may be a polymerizable monomer having at least one functional group represented by Chemical Formula 5 at the terminal end.

[Chemical Formula 5]

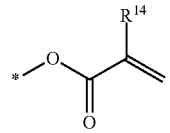

In Chemical Formula 5, $R^{14}$ is a hydrogen atom or a substituted or unsubstituted C1 to C20 alkyl group.

The polymerizable monomer includes at least one carbon-carbon double bond at the terminal end, specifically, at least one functional group represented by Chemical Formula 5, thereby forming a crosslinked structure with the semiconductor nanorods, further improving the dispersion stability of the semiconductor nanorods.

For example, the polymerizable monomer including at least one functional group represented by Chemical Formula 5 at the terminal end may be ethylene glycol diacrylate, triethylene glycoldiacrylate, 1,4-butanedioldiacrylate, 1,6-hexanedioldiacrylate, neopentylglycoldiacrylate, pentaerythritoldiacrylate, pentaerythritoltriacrylate, dipentaerythritoldiacrylate, dipentaerythritoltriacrylate, dipentaerythritolpentaacrylate, pentaerythritolhexaacrylate, bisphenol A diacrylate, trimethylolpropanetriacrylate, novolacepoxyacrylate, ethylene glycoldimethacrylate, diethylene glycoldimethacrylate, triethylene glycoldimethacrylate, propylene glycoldimethacrylate, 1,4-butanedioldimethacrylate, 1,6-hexanedioldimethacrylate, multi-functional epoxy (meth)acrylate, multi-functional urethane (meth)acrylate, KAYARAD DPCA-20, KAYARAD DPCA-30, KAYARAD DPCA-60, KAYARAD DPCA-120, KAYARAD DPEA-12, or a combination thereof manufactured by Japan Chemical Co., Ltd., but is not necessarily limited thereto.

Polymerization Initiator

The ink composition according to the embodiment may further include a polymerization initiator, for example, a photopolymerization initiator, a thermal polymerization initiator, or a combination thereof.

The photopolymerization initiator may be an initiator generally used in curable compositions, for example, an acetophenone-based compound, a benzophenone-based compound, a thioxanthone-based compound, a benzoin-based compound, a triazine-based compound, an oxime-based compound, and an aminoketone-based compound, but is not necessarily limited thereto.

Examples of the acetophenone-based compound may be 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like.

Examples of the benzophenone-based compound may include benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenonem, and the like.

Examples of the thioxanthone-based compound may be thioxanthone, 2-methylthioxanthone, isopropyl thioxanthone, 2,4-diethyl thioxanthone, 2,4-diisopropyl thioxanthone, 2-chlorothioxanthone, and the like.

Examples of the benzoin-based compound may be benzoin, benzoin methyl ether, benzoin ethyl ether, benzoin isopropyl ether, benzoin isobutyl ether, benzyldimethylketal, and the like.

Examples of the triazine-based compound may be 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloro methyl)-s-triazine, bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like.

Examples of the oxime compound may include an O-acyloxime compound, 2-(O-benzoyloxime)-1-[4-(phenylthio)phenyl]-1,2-octanedione, 1-(O-acetyloxime)-1-[9-ethyl-6-(2-methylbenzoyl)-9H-carbazol-3-yl]ethanone, O-ethoxycarbonyl-a-oxyamino-1-phenylpropan-1-one, and the like. Specific examples of the O-acyloxime-based compound may include 1,2-octanedione, 2-dimethylamino-2-(4-methylbenzyl)-1-(4-morpholin-4-yl-phenyl)-butane-1-one, 1-(4-phenylsulfanylphenyl)-butane-1,2-dione-2-oxime-O-benzoate, 1-(4-phenylsulfanylphenyl)-octane-1,2-dione-2-oxime-O-benzoate, 1-(4-phenylsulfanylphenyl)-octan-1-oneoxime-O-acetate, 1-(4-phenylsulfanylphenyl)-butan-1-oneoxime-O-acetate, and the like.

Examples of the aminoketone-based compound may include 2-benzyl-2-dimethylamino-1-(4-morpholinophenyl)-butanone-1.

The photopolymerization initiator may further include a carbazole-based compound, a diketone-based compound, a sulfonium borate-based compound, a diazo-based compound, an imidazole-based compound, a biimidazole-based compound, and the like, besides the compounds.

The photopolymerization initiator may be used with a photosensitizer capable of causing a chemical reaction by absorbing light and becoming excited and then, transferring its energy.

Examples of the photosensitizer may be tetraethylene glycol bis-3-mercapto propionate, pentaerythritol tetrakis-3-mercapto propionate, dipentaerythritol tetrakis-3-mercapto propionate, and the like.

Examples of the thermal polymerization initiator may be peroxide, specifically, benzoyl peroxide, dibenzoyl peroxide, lauryl peroxide, dilauryl peroxide, di-tert-butyl peroxide, cyclohexane peroxide, methyl ethyl ketone peroxide, hydroperoxide (e.g., tert-butyl hydroperoxide, cumene hydroperoxide), dicyclohexyl peroxydicarbonate, 2,2-azobis(isobutyronitrile), t-butyl perbenzoate, and the like and also, 2,2'-azobis-2-methylpropinonitrile and the like, but are not necessarily limited thereto and may include anything widely known in the related field.

The polymerization initiator may be included in an amount of 1 wt % to 5 wt %, for example 2 wt % to 4 wt % based on the total solid amount of the ink composition. When the polymerization initiator is included within the ranges, the ink composition may be sufficiently cured during the exposure or thermal curing and thus obtain excellent reliability.

Other Additives

The ink composition according to an embodiment may further include a polymerization inhibitor including a hydroquinone-based compound, a catechol-based compound, or a combination thereof. As the ink composition according to an embodiment further includes the hydroquinone-based compound, catechol-based compound, or combination thereof, after printing (coating) an ink composition, cross-linking at room temperature may be prevented during exposure.

For example, the hydroquinone-based compound, catechol-based compound, or combination thereof may include hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O, O')aluminium, or a combination thereof, but is not necessarily limited thereto.

The hydroquinone-based compound, catechol-based compound, or combination thereof may be used in a dispersion type and the dispersion-type polymerization inhibitor may be included in an amount of 0.001 wt % to 1 wt %, for example 0.01 wt % to 0.1 wt %, based on the total amount of the ink composition. When the stabilizer is included within the above range, the problem with aging at room temperature may be solved and sensitivity reduction and surface peeling may be prevented.

The ink composition according to an embodiment may further include malonic acid; 3-amino-1,2-propanediol; a silane-based coupling agent; a leveling agent; a fluorine-based surfactant; or a combination thereof in addition to the polymerization inhibitor.

For example, the ink composition for an electrophoresis device may further include a silane coupling agent having a reactive substituent such as a carboxyl group, a methacryloyl group, an isocyanate group, an epoxy group, and the like to improve its adherence to a substrate.

Examples of the silane-based coupling agent may include trimethoxysilyl benzoic acid, γ-methacryl oxypropyl trimethoxysilane, vinyl triacetoxysilane, vinyl trimethoxysilane, γ-isocyanate propyl triethoxysilane, γ-glycidoxy propyl trimethoxysilane, β-epoxycyclohexyl)ethyltrimethoxysilane, and the like. These may be used alone or in a mixture of two or more.

The silane-based coupling agent may be included in an amount of 0.01 parts by weight to 10 parts by weight based on 100 parts by weight of the ink composition. When the silane-coupling agent is included within the range, close contacting property, storing property, and the like may be improved.

In addition, the ink composition may further include a surfactant, for example a fluorine-based surfactant to improve coating and prevent a defect if necessary.

Examples of the fluorine-based surfactant may be BM-1000® and BM-1100® of BM Chemie Inc.; MEGAFACE F 142D®, MEGAFACE F 172®, MEGAFACE F 173®, and MEGAFACE F 183® of Dainippon Ink Kagaku Kogyo Co., Ltd.; FULORAD FC-135®, FULORAD FC-170C®, FULORAD FC-430®, and FULORAD FC-431® of Sumitomo 3M Co., Ltd.; SURFLON S-112®, SURFLON S-113®, SURFLON S-131®, SURFLON S-141®, and SURFLON S-145® of ASAHI Glass Co., Ltd.; and SH-28PA®, SH-190®, SH-193®, SZ-6032®, and SF-8428®, and the like of Toray Silicone Co., Ltd.; F-482, F-484, F-478, F-554, and the like of DIC Co., Ltd.

The fluorine-based surfactant may be included in an amount of 0.001 parts by weight to 5 parts by weight based on 100 parts by weight of the ink composition. When the fluorine-based surfactant is included within the above range, excellent wetting on a glass substrate as well as coating uniformity may be secured, and a stain may not be produced.

In addition, a certain amount of other additives such as antioxidants and stabilizers may be further added to the ink composition within a range that does not impair physical properties.

Another embodiment provides a layer using the ink composition.

Another embodiment provides a display device including the layer, and for example the display device may be an electrophoresis device.

redispersed in 40 ml of acetone and filtered with a 10 μm mesh filter. After additional centrifugation (4000 rpm, 10 minutes), the precipitate was dried in a drying oven (100° C. for 1 hour), weighed, and dispersed to be 0.05 w/w % to prepare each ink composition having compositions shown in Tables 1 and 2.

TABLE 1

(unit: g)

| | | Ex. 1 | Ex. 2 | Ex. 3 | Ex. 4 | Ex. 5 | Ex. 6 |
|---|---|---|---|---|---|---|---|
| (A) semiconductor nanorod | | 0.05 | 0.05 | 0.05 | 0.05 | 0.05 | 0.05 |
| (B) solvent | (B-1) | — | 30 | — | — | — | — |
| | (B-2) | — | — | 40 | — | — | — |
| | (B-3) | — | — | — | 55 | — | — |
| | (B-4) | — | — | — | — | 60 | — |
| | (B-5) | 100 | — | — | — | — | 80 |
| | (B-6) | — | 70 | 60 | 45 | 40 | — |
| | (B-7) | — | — | — | — | — | 20 |

TABLE 2

(unit: g)

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| (A) semiconductor nanorod | | 0.05 | 0.05 | 0.05 | 0.05 | 0.05 | 0.05 |
| (B) solvent | (B-6) | 100 | — | — | — | — | — |
| | (B-8) | — | 100 | — | — | — | — |
| | (B-9) | — | — | 100 | — | — | — |
| | (B-10) | — | — | — | 100 | — | — |
| | (B-11) | — | — | — | — | 100 | — |
| | (B-12) | — | — | — | — | — | 100 |

MODE FOR INVENTION

Hereinafter, the present invention is illustrated in more detail with reference to examples. These examples, however, are not in any sense to be interpreted as limiting the scope of the invention.

Preparation of Ink Composition

Examples 1 to 6 and Comparative Examples 1 to 6

A nanorod-patterned GaN wafer (4 inches) was reacted in 40 ml of stearic acid (1.5 mM) at room temperature for 24 hours. After the reaction, the nanorod-patterned GaN was dipped in 50 ml of acetone for 5 minutes to remove an excessive amount of the stearic acid, and additionally, 40 ml of acetone was used to rinse the surface of the wafer. The washed wafer was placed with 35 ml of γ-butyrolactone (GBL) in a 27 KW bath-type sonicator and then, sonicated for 5 minutes to separate the rods from the wafer surface. The separated rods were placed in a FALCON tube for a centrifuge, and 10 ml of GBL was added thereto to additionally wash the rods on the surface of the bath. Then, a supernatant was discarded therefrom through centrifugation at 4000 rpm for 10 minutes, and precipitates therein were Type of Solvent
(B-1) 2,4-Diethyl-1,5-pentanediol
(B-2) 2-Ethyl-1,3-Hexanediol
(B-3) 3-methyl-1,5-pentanediol
(B-4) 1,5-pentanediol
(B-5) Propanediol
(B-6) Triethyl citrate
(B-7) Triallyl isocyanurate
(B-8) polyethylene glycol
(B-9) propylene glycol
(B-10) 2-Methyl-2,4-pentanediol
(B-11) PGMEA
(B-12) GBL Evaluation: Viscosity, Dielectric Constant, Dispersion Stability, and Dielectrophoretic Properties of Ink Compositions The ink compositions according to Examples 1 to 6 and Comparative Examples 1 to 6 were measured with respect to viscosity (25° C., 50° C.), a dielectric constant, dispersion stability, and dielectrophoretic properties, and the results are shown in Table 3.

The viscosity of the solvents was measured respectively at 25° C. and 50° C. by using a rheometer (Haake) and loading 2 ml of each composition.

The dielectric constant was measured by loading 40 ml of each ink composition in a conical tube and using a liquid dielectric constant meter (Model 871, Furuto) at 25° C.

The dispersion stability was measured by loading 10 ml of each ink composition in a test-tube with a diameter of 1 cm and a height of 13 cm and then, checking time when precipitates at the bottom were generated at room temperature.

The dielectrophoretic properties were measured in the following method.

First, 500 μl of each nanorod ink composition was coated on thin-film Gold basic interdigitated linear electrodes (ED-cIDE4-Au, Micrux Technologies) and after applying an electric field (25 KHz, +30 v) thereto, allowed to stand for 1 minute. After drying the solvent on a hot plate, a microscope was used to count the number of arranged nanorods (ea) and the number of non-arranged nanorods (ea) between the electrodes to evaluate the dielectrophoretic properties.

TABLE 3

|  | Viscosity at 25° C. (cps) | Viscosity at 50° C. (cps) | Dielectric constant | Dispersion stability (hr) | Dielectrophoresis (%) |
|---|---|---|---|---|---|
| Example 1 | 52 | 18 | 14 | 5 | 90 |
| Example 2 | 64 | 15 | 11 | 10 | 94 |
| Example 3 | 65 | 15 | 12 | 10 | 94 |
| Example 4 | 69 | 15 | 13 | 11 | 91 |
| Example 5 | 66 | 15 | 14 | 10 | 90 |
| Example 6 | 63 | 15 | 12 | 10 | 94 |
| Comparative Example 1 | 30 | 10 | 9 | 3 | 85 |
| Comparative Example 2 | 90 | 62 | 16 | 11 | 30 |
| Comparative Example 3 | 45 | 20 | 15 | 4 | 60 |
| Comparative Example 4 | 28 | — (ND) | 15 | 2 | 68 |
| Comparative Example 5 | 1 | — (ND) | 7 | <1 | 60 |
| Comparative Example 6 | 2 | — (ND) | 41 | <1 | 10 |

(ND: Not Detected)

As shown in Table 3, Examples 1 to 6 exhibited higher viscosity at 25° C. and lower viscosity at 50° C. than Comparative Examples 1 to 6 and thus had a dielectric constant within an appropriate range and also, exhibited excellent dispersion stability and dielectrophoretic properties, which turned out to be suitable for large-area coatings and panel production.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. An ink composition, comprising
(A) semiconductor nanorods; and
(B) a solvent including at least at least one diol-based compound and a compound represented by Chemical Formula 2 or Chemical Formula 3:

[Chemical Formula 2]

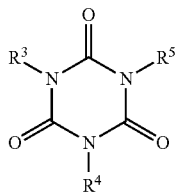

[Chemical Formula 3]

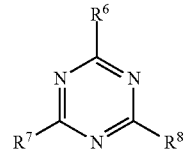

wherein, in Chemical Formula 2 and Chemical Formula 3,
$R^3$ to $R^5$ are each independently a substituted or unsubstituted C1 to C20 alkyl group, and
$R^6$ to $R^8$ are each independently a substituted or unsubstituted C1 to C20 alkoxy group, and
wherein the ink composition has a viscosity of greater than or equal to 50 cps at 20° C. to 25° C. and less than or equal to 20 cps at 35° C. to 65° C.

2. The ink composition of claim 1, wherein the diol-based compound is represented by Chemical Formula 1:

[Chemical Formula 1]

$$\text{HO} \overset{R^1}{\underset{}{\frown}} L^1 \overset{R^2}{\underset{}{\frown}} \text{OH}$$

wherein, in Chemical Formula 1,
$R^1$ and $R^2$ are each independently hydrogen, a substituted or unsubstituted C1 to C20 alkyl group, a substituted or unsubstituted C3 to C20 cycloalkyl group, or a substituted or unsubstituted C6 to C20 aryl group, and
$L^1$ is a substituted or unsubstituted C1 to C20 alkylene group.

3. The ink composition of claim 1, wherein the diol-based compound comprises at least one of compounds represented by Chemical Formula 1-1 to Chemical Formula 1-5:

[Chemical Formula 1-1]

$$\text{HO} \overset{CH_3}{\underset{}{\frown}} \overset{CH_3}{\underset{}{\frown}} \text{OH}$$

-continued

[Chemical Formula 1-2]
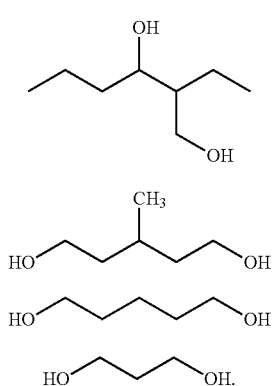

[Chemical Formula 1-3]

[Chemical Formula 1-4]

[Chemical Formula 1-5]

4. The ink composition of claim 1, wherein the compound represented by Chemical Formula 2 or Chemical Formula 3 comprises at least one selected from compounds represented by Chemical Formula 2-1, Chemical Formula 2-2, Chemical Formula 3-1, and Chemical Formula 3-2:

[Chemical Formula 2-1]
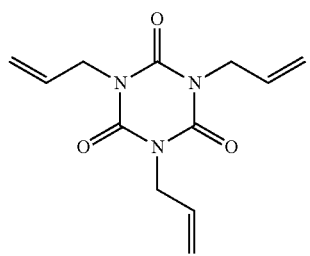

[Chemical Formula 2-2]
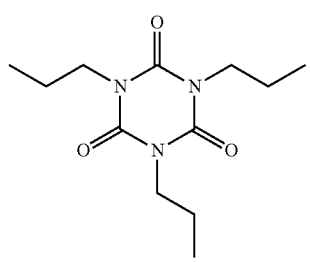

[Chemical Formula 3-1]
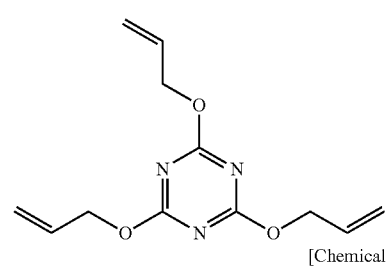

[Chemical Formula 3-2]
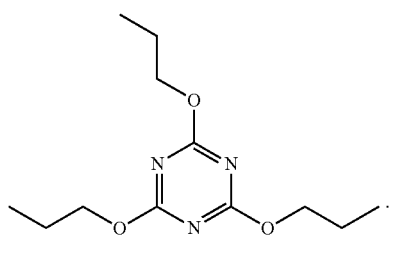

5. The ink composition of claim 1, wherein the compound represented by Chemical Formula 2 or Chemical Formula 3 is included in a smaller amount than the diol-based compound.

6. An ink composition, comprising
   (A) semiconductor nanorods; and
   (B) a solvent including at least at least one diol-based compound and a compound represented by Chemical Formula 4:

[Chemical Formula 4]
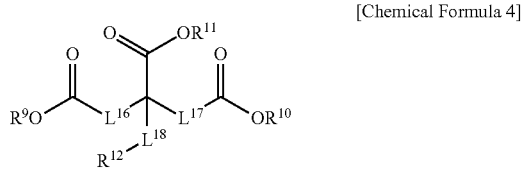

wherein, in Chemical Formula 4, $R^9$ to $R^{11}$ are each independently a hydrogen atom or a C1 to C10 alkyl group, $R^{12}$ is a hydrogen atom or *—C(=O)$R^{13}$ ($R^{13}$ is a C1 to C10 alkyl group), $L^{16}$ and $L^{17}$ are each independently a substituted or unsubstituted C1 to C20 alkylene group or a substituted or unsubstituted C6 to C20 arylene group, and $L^{18}$ is *—O—*, *—S—*, or *—NH—*, and wherein the ink composition has a viscosity of greater than or equal to 50 cps at 20° C. to 25° C. and less than or equal to 20 cps at 35° C. to 65° C.

7. The ink composition of claim 6, wherein the diol-based compound and the compound represented by Chemical Formula 4 are included in a weight ratio of 3:7 to 8:2.

8. The ink composition of claim 1, wherein the semiconductor nanorods have a diameter of 300 nm to 900 nm.

9. The ink composition of claim 1, wherein the semiconductor nanorods have a length of 3.5 μm to 5 μm.

10. The ink composition of claim 1, wherein the semiconductor nanorods comprise a GaN-based compound, an InGaN-based compound, or a combination thereof.

11. The ink composition of claim 1, wherein surfaces of the semiconductor nanorods are coated with a metal oxide.

12. The ink composition of claim 11, wherein the metal oxide comprises alumina, silica, or a combination thereof.

13. The ink composition of claim 1, wherein the semiconductor nanorods are included in an amount of 0.01 wt % to 10 wt % based on the total amount of the ink composition.

14. The ink composition of claim 1, wherein the ink composition further comprises a polymerization inhibitor; malonic acid; 3-amino-1,2-propanediol; a silane-based coupling agent; a leveling agent; a fluorine-based surfactant; or a combination thereof.

15. The ink composition of claim 1, wherein the ink composition is an ink composition for an electrophoresis device.

16. A layer manufactured using the ink composition of claim 1.

17. A display device comprising the layer of claim 16.

* * * * *